United States Patent
Ravimohan et al.

(10) Patent No.: US 12,032,420 B2
(45) Date of Patent: Jul. 9, 2024

(54) STORAGE SYSTEM AND METHOD FOR DATA-DRIVEN INTELLIGENT THERMAL THROTTLING

(71) Applicant: Western Digital Technologies, Inc., San Jose, CA (US)

(72) Inventors: Narendhiran Chinnaanangur Ravimohan, Bangalore (IN); Ankit Gupta, Bangalore (IN); Sai Revanth Reddy Chappidi, Andhra Pradesh (IN)

(73) Assignee: SanDisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/177,523

(22) Filed: Feb. 17, 2021

(65) Prior Publication Data

US 2022/0155832 A1 May 19, 2022

Related U.S. Application Data (60) Provisional application No. 63/114,854, filed on Nov. 17, 2020.

(51) Int. Cl.
*G06F 1/20* (2006.01)
*G06F 3/06* (2006.01)

(52) U.S. Cl.
CPC .......... *G06F 1/206* (2013.01); *G06F 3/0604* (2013.01); *G06F 3/0613* (2013.01); *G06F 3/0653* (2013.01); *G06F 3/0659* (2013.01); *G06F 3/0679* (2013.01)

(58) Field of Classification Search
CPC ...... G06F 1/206; G06F 1/3206; G06F 3/0604; G06F 3/0619; G06F 3/0613; G06F 3/0653; G06F 3/0659; G06F 3/0679; G06F 3/0688; G06F 11/3058; G06F 2201/81; G01K 3/10; G01K 13/00; G11C 7/04; G05D 23/1919
See application file for complete search history.

(56) References Cited

U.S. PATENT DOCUMENTS

| | | | |
|---|---|---|---|
| 8,694,719 B2 | 4/2014 | Lassa et al. | |
| 9,760,311 B1 * | 9/2017 | Amir | G06F 3/0653 |
| 9,971,530 B1 | 5/2018 | Yang et al. | |
| 10,007,311 B2 | 6/2018 | Raghu et al. | |
| 10,845,854 B1 * | 11/2020 | Winter | G06F 1/203 |
| 2010/0023678 A1 * | 1/2010 | Nakanishi | G11C 16/102 |
| | | | 327/512 |

(Continued)

OTHER PUBLICATIONS

ES205 Analysis and Design of Engineering Systems—Lab 7, 2017, Rose-Hulman Institute of Technology, pp. 1-9; https://web.archive.org/web/20170407123500/https://www.rose-hulman.edu/ES205/PDFs/lab07_handoutUsingExcel_s2008.pdf ( Year: 2017).*

(Continued)

*Primary Examiner* — Curtis James Kortman
(74) *Attorney, Agent, or Firm* — Crowell & Moring LLP (57) ABSTRACT

A storage system and method for data-driven intelligent thermal throttling are provided. In one embodiment, the storage system comprises a memory and a controller. The controller is configured to determine a temperature of the memory, estimate a future temperature curve based on the temperature of the memory, and determine a memory throttling delay to apply based on the estimated future temperature curve. Other embodiments are provided.

17 Claims, 9 Drawing Sheets

(56) References Cited

U.S. PATENT DOCUMENTS

| | | | | |
|---|---|---|---|---|
| 2016/0124475 A1* | 5/2016 | Chandra | ................ | G06F 1/206 |
| | | | | 700/300 |
| 2016/0320971 A1 | 11/2016 | Postavilsky et al. | | |
| 2017/0220022 A1* | 8/2017 | Hankendi | ........... | G06F 11/3058 |
| 2017/0351279 A1* | 12/2017 | Ishii | ........................ | G06F 1/203 |
| 2020/0210106 A1* | 7/2020 | Cariello | ............. | G06F 13/1668 |
| 2020/0363856 A1* | 11/2020 | Kulkarni | ................ | G06F 1/206 |
| 2021/0026425 A1* | 1/2021 | Spica | ..................... | G06F 1/185 |
| 2021/0200654 A1* | 7/2021 | Elmtalab | ............. | G06F 12/0246 |

OTHER PUBLICATIONS

Time constant, Sep. 20, 2020, Wikipedia, as preserved by the Internet Archive on Sep. 20, 2020, pp. 1-9; https://web.archive.org/web/20200920184030/http://en.wikipedia.org/wiki/Time_constant (Year: 2020).*

Least squares, Dec. 4, 2019, Wikipedia, as preserved by the Internet Archive on Dec. 4, 2019, pp. 1-11; web.archive.org/web/20191204221712/https://en.wikipedia.org/wiki/Least_squares (Year: 2019).*

\* cited by examiner

STORAGE SYSTEM AND METHOD FOR DATA-DRIVEN INTELLIGENT THERMAL THROTTLING

CROSS-REFERENCE TO RELATED APPLICATION

This application claims the benefit of U.S. provisional patent application No. 63/114,854, filed Nov. 17, 2020, which is hereby incorporated by reference.

BACKGROUND

Thermal constraints can be significant in Flash storage systems. One way to mitigate temperature issues is by using a heat sink. Another way is to throttle the performance of the storage system. Throttling is often used when a heat sink is not a viable option for the form factor of the storage system. Some storage systems employ static throttling where fixed delays are introduced when the temperature of the storage system reaches a certain threshold.

DETAILED DESCRIPTION

Overview

By way of introduction, the below embodiments relate to a storage system and method for data-driven intelligent thermal throttling. In one embodiment, a storage system is provided comprising a memory and a controller. The controller is configured to determine a temperature of the memory; estimate a future temperature curve based on the temperature of the memory; and determine a memory throttling delay to apply based on the estimated future temperature curve.

In some embodiments, the controller is further configured to estimate the future temperature curve based on a saturating temperature (K) and a curvature factor (R).

In some embodiments, the controller is further configured to sample the temperature of the memory over a plurality of time windows.

In some embodiments, at least one of the following dynamically changes based on the temperature of the memory: a length of a time window, a frequency of sampling the temperature of the memory in a time window, and a number of time windows in the plurality of time windows.

In some embodiments, the controller is further configured to estimate the future temperature curve based on the sampled temperature in each time window.

In some embodiments, the controller is further configured to estimate the future temperature curve by minimizing a sum of squares of errors.

In some embodiments, the controller is further configured to estimate a new future temperature curve after applying the determined memory throttling delay.

In some embodiments, the controller is further configured to apply static throttling as an exception handling operation.

In some embodiments, the memory comprises a three-dimensional memory.

In another embodiment, a method is provided that is performed in a storage system comprising a memory. The method comprises predicting a curve of temperatures that the memory will experience and dynamically throttling memory operations based on the predicted curve.

In some embodiments, the curve is predicted based on an actual temperature of the memory, a saturating temperature (K), and a curvature factor (R).

In some embodiments, the method further comprises sampling temperature of the memory over a plurality of time windows.

In some embodiments, at least one of the following dynamically changes based on the temperature of the memory: a length of a time window, a frequency of sampling the temperature of the memory in a time window, and a number of time windows in the plurality of time windows.

In some embodiments, the method further comprises using a minimizing-a-sum-of-squares-of-errors technique to predict the curve.

In some embodiments, the method further comprises predicting a new curve after dynamically throttling the memory operations.

In some embodiments, the method further comprises applying static throttling in response to an exception.

In another embodiment, a storage system is provided comprising a memory, means for predicting a future temperature of the memory, and means for throttling memory operations based on the predicted future temperature of the memory.

In some embodiments, the predicted future temperature of the memory is based on an estimated temperature curve.

In some embodiments, the temperature curve is estimated based on an actual temperature of the memory, a saturating temperature (K), and a curvature factor (R).

In some embodiments, the temperature curve is estimated using a minimizing-a-sum-of-squares-of-errors technique.

Other embodiments are possible, and each of the embodiments can be used alone or together in combination. Accordingly, various embodiments will now be described with reference to the attached drawings.

Embodiments

Figures 1A, 1B:
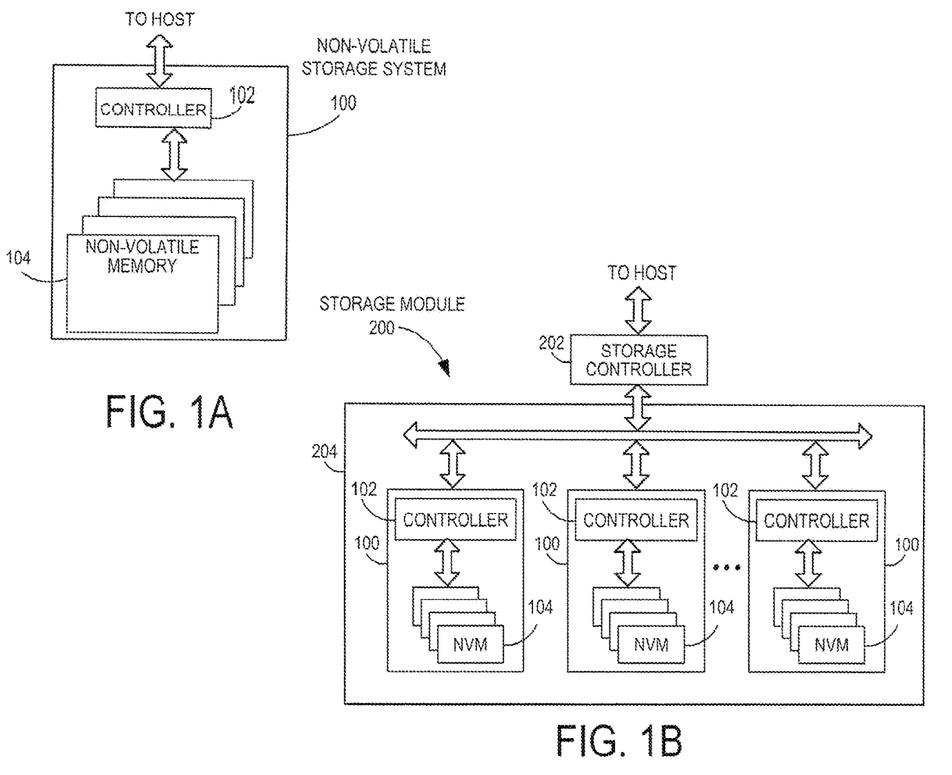
FIG. 1A is a block diagram of a non-volatile storage system of an embodiment.
FIG. 1B is a block diagram illustrating a storage module of an embodiment.
Figure 1C:
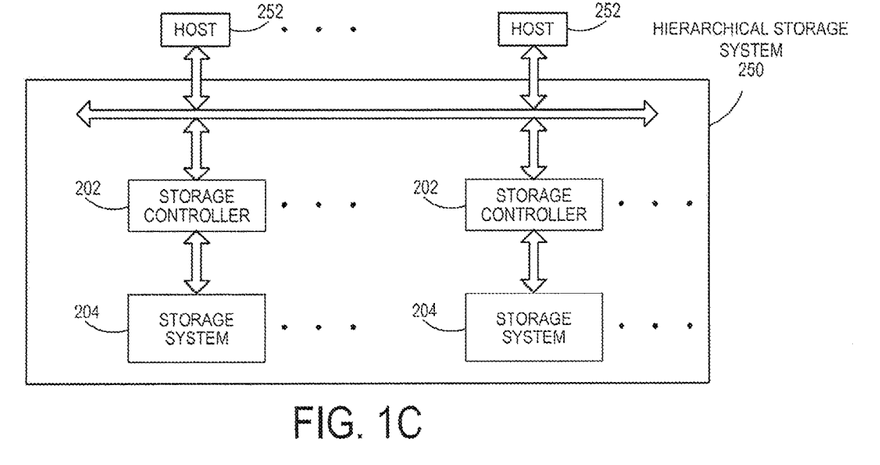
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
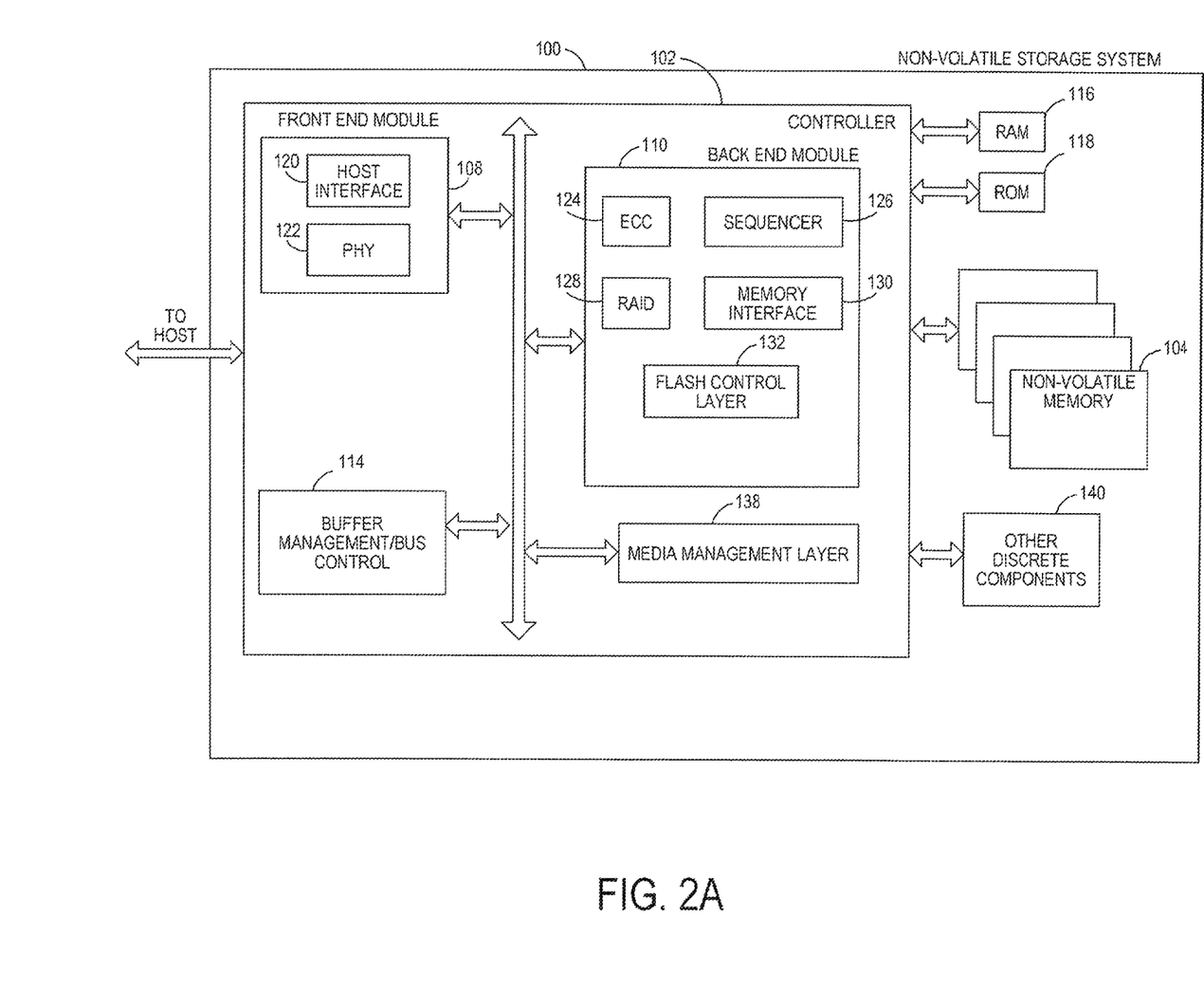
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually per-forms a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
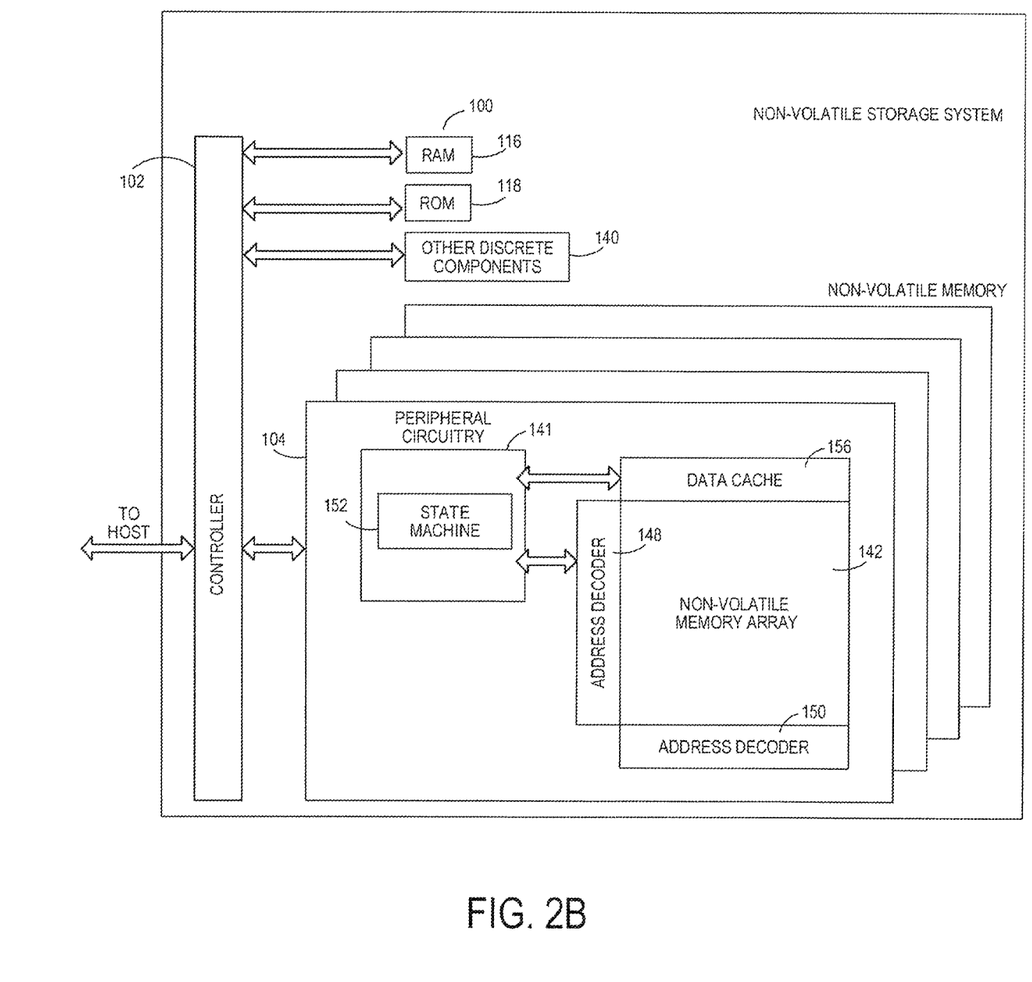
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
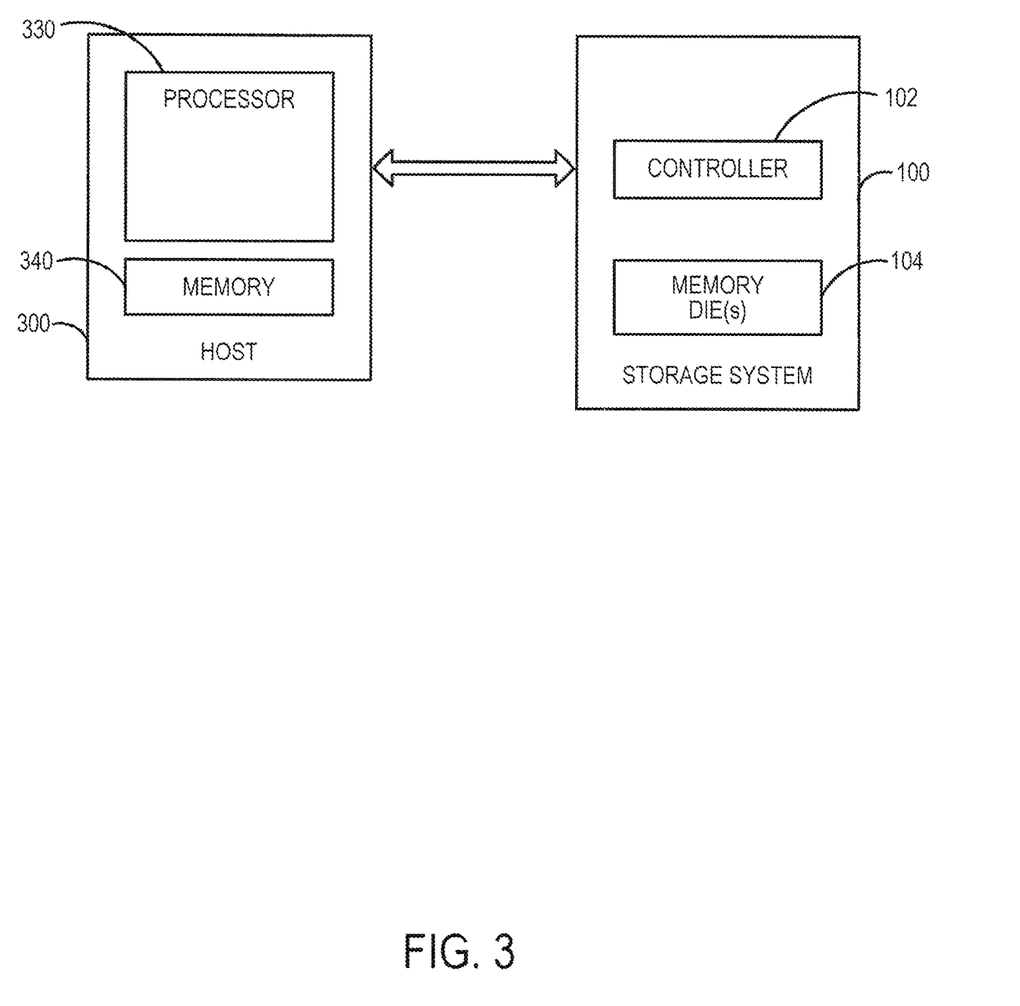
FIG. 3 is a block diagram of a host and storage system of an embodiment.

Turning again to the drawings, FIG. 3 is a block diagram of a host 300 and storage system 100 (sometimes referred to herein as "the device") of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, thermal constraints can be significant in Flash storage systems. One way to mitigate temperature issues is to use a heat sink, and the other way is to throttle the performance of the storage system. Throttling is often used when a heat sink is not a viable option for the form factor of the storage system. Some storage systems employ static throttling where fixed delays are introduced when the temperature of the storage system reaches a certain threshold.

Static throttling is based on static temperature limits and throttle amounts set by engineers based on trial-and-error analysis of the temperature curve. The analysis can be done after conducting various experiments under different host/environment conditions where various static delays are introduced at various temperature thresholds. Because the thresholds and delays are fixed, they are decided to accommodate severe environment/host conditions. Because these temperature thresholds and delays are pre-defined to accommodate worst-case scenarios, a lot of performance can be wasted in most of the general cases, as the introduced delays might be far greater than required.

Figure 4:
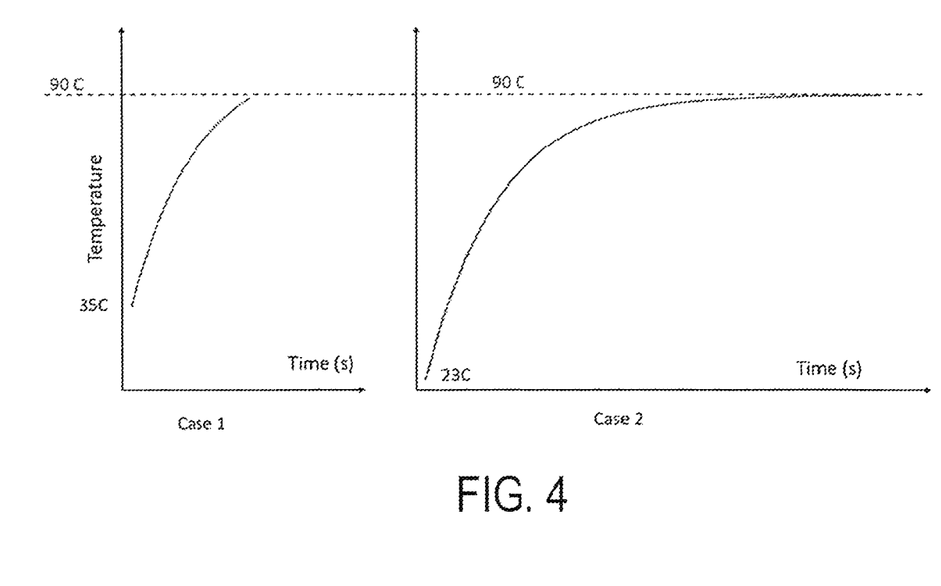
FIG. 4 is a graph of two cases of throttling a storage system of an embodiment.

For example, consider the two different cases shown in FIG. 4 for a storage system having a performance of 100 megabits per second (MBPS). The temperature in Case 1 is likely to reach 110° C. after some time, while the temperature in Case 2 will not even cross 90° C., if the curve is extrapolated. If the temperature threshold is set at 90° C., then the system treats both of the above cases in the same manner and throttles by say 40 MBPS when the temperature hits 90° C., which is justified in Case 1 but not in Case 2. So, a solution is needed that gives optimal delays based on a future curve prediction instead of just the temperature value at any instant. Such solution can easily yield an average performance improvement of 30 MBPS in the above example when transferring a large file or where there is a continuous performance requirement.

The following embodiments explain how the controller 102 of the storage system 100 can use temperature sensor data to estimate the future temperature curve and dynamically introduce delays so that the end user experiences is optimal, and sustained and smooth performance can be met under various scenarios pertaining to changes in environment, host conditions, NAND conditions, data noise, etc. This dynamic throttling can even be extended to other systems with thermal constraints, such as laptops, smartphones, etc.

More specifically, in one embodiment, to overcome the above-mentioned limitations, the controller 102 of the storage system 100 can use a data-driven intelligent thermal throttling method, where the controller 102 (e.g., firmware) utilizes memory array (e.g., NAND) 104 temperature sensor data to estimate a future temperature curve and give optimal delays at certain temperature thresholds based on the estimated curve. The throttling of memory operations can throttle read and/or write operations to the memory (e.g., reducing the number of such operations that are performed over time). Before turning to the details on this method, an equation will be derived to understand the behavior of temperature at various scenarios. This equation can be used in the curve estimation. It should be noted that this particular equation is just one possible implementation, and other implementations can be used. Also, while these examples will be discussed in terms of a storage system (e.g., in this example, a microSD card), it should be noted that the below derivation can be used with any suitable system with thermal constraints (e.g., a smartphone, laptop, etc.).

The main reason for an increase in the temperature of the storage system 100 is the power generation by the card, which depends on NAND performance. Based on the characteristics of the card and its surroundings, a part of the heat generated is dissipated to the surroundings, and the remaining part is consumed by the card to raise its temperature.

So, consider a small instance of time 'dt', during which:
1. 'dG' heat is generated by the card due to the NAND performance
2. 'dQ' heat is used by the card to raise the temperature by 'dT'
3. 'dE' heat is released outside $$=> dG = dQ + dE \quad \text{(Energy conservation)} \quad \text{(Equation 1)}$$

$$=> \frac{dG}{dt} = \frac{dQ}{dt} + \frac{dE}{dt}$$

Power generation by the card (P) is the rate of heat generation.

$$P = \frac{dG}{dt} \quad \text{(Equation 2)}$$

P is dependent on the NAND performance but is independent of time or temperature. And say 'C' is the cumulative heat capacity of the card. By definition of heat capacity, $$C = \frac{dQ}{dT} \quad \text{(Equation 3)}$$

$$=> dQ = C \cdot dT$$

$$=> \frac{dQ}{dt} = C \cdot \frac{dT}{dt}$$

Heat transfer to the surroundings is happening through the air by the mode of convective heat transfer. The equation of which is described as follows:

$$\frac{dE}{dt} = H \cdot A \cdot (T - T_s) \quad \text{(Equation 4)}$$

Where H is the heat transfer coefficient, A is the area available for heat transfer $T_s$ is the surrounding temperature From the equations 1, 2, 3, and 4:

$$P = C \frac{dT}{dt} + H \cdot A \cdot (T - T_s)$$

$$=> \frac{P}{C} = \frac{dT}{dt} + \frac{H \cdot A}{C}(T - T_s)$$

$$=> \frac{dT}{dt} = \frac{P}{C} - \frac{H \cdot A}{C}(T - T_s)$$

$$=> \frac{dT}{(P - H \cdot A(T - T_s))} = \frac{dt}{C}$$

$$=> \frac{dT}{(P + H \cdot A \cdot T_s - H \cdot A \cdot T)} = \frac{dt}{C}$$

$$=> \int_{T_0}^{T} \frac{dT}{(P + H \cdot A \cdot T_s - H \cdot A \cdot T)} = \int_{0}^{t} \frac{dt}{C}$$

$$=> \left[\frac{\ln(P + H \cdot A \cdot T_s - H \cdot A \cdot T)}{-H \cdot A}\right]_{T_0}^{T} = \frac{[t]_0^t}{C}$$

$$=> \frac{(\ln(P + H \cdot A \cdot T_s - H \cdot A \cdot T) - \ln(P + H \cdot A \cdot T_s - H \cdot A \cdot T_0))}{(-H \cdot A)} = \frac{t - 0}{C}$$

Consider H.A=h $$=> \frac{(\ln(P + h \cdot T_s - h \cdot T) - \ln(P + h \cdot T_s - h \cdot T_0))}{-h} = \frac{t}{C}$$

$$=> \ln\left(\frac{P + h \cdot T_s - h \cdot T}{P + h \cdot T_s - h \cdot T_0}\right) = \frac{-ht}{C}$$

$$=> \frac{P + h \cdot T_s - h \cdot T}{P + h \cdot T_s - h \cdot T_0} = e^{\frac{-ht}{C}}$$

$$=> P + h \cdot T_s - h \cdot T = e^{\frac{-ht}{C}}(P + h \cdot T_s - h \cdot T_0)$$

$$=> h \cdot T = P + h \cdot T_s - e^{\frac{-ht}{C}}(P + h \cdot T_s - h \cdot T_0)$$

$$=> T = \frac{P + h \cdot T_s}{h} - e^{\frac{-ht}{C}}\left(\frac{P + h \cdot T_s}{h} - T_0\right)$$

Considering $K = \frac{P + h \cdot T_s}{h}$ and $R = \frac{h}{C}$;

Ignoring the mutual dependence of K and R over the factor h for simpler estimation;

$$T = K - e^{-Rt}(K - T_0)$$

The above equation coincides with Newton's law of cooling, which is $T=T_{env}-e^{-Rt}(T_{env}-T_0)$. The fundamental difference lies in the proof, where there is no external factor like a power generation component in Newton's law, which affects the saturating temperature.

Though various parameters are assumed constant with time while deriving the equation, they can slightly vary due to various surrounding factors. However, a cumulative value of a parameter for a time range [0→t] will always hold valid for the equation.

Hence, temperature of any product can be estimated just by estimating the two parameters K and R, irrespective of change in host, device, or surrounding conditions for any product.

The below section explains the behavior of the curve with the change in K, R values.

As can be seen in the equation, T=K at t=∞. So, K is the saturating temperature.

As $$K = \frac{P \to h \cdot T_s}{h} = \frac{P}{h} + T_s,$$

K mostly depends on the surrounding temperature and the performance. As we cannot control the surrounding temperature, we can decrease performance to decrease saturating temperature.

And the other factor is 'R,' which decides the curvature of the temperature and how fast the temperature can reach closer to the saturating temperature.

As $$R = \frac{h}{C},$$

R mainly depends on the device characteristics, so R does not vary much for a system. The surroundings can have an impact on the value of R. So, if the host containing the card is placed in an enclosed area (e.g., a bag), that affects the availability of airflow and surface area for heat release.

Having a heat sink would reduce the value of the 'R,' which makes the curve less sharp, and the rate of temperature increment is reduced. But a storage device with a small form factor has no scope to control 'R.'

Figure 5:
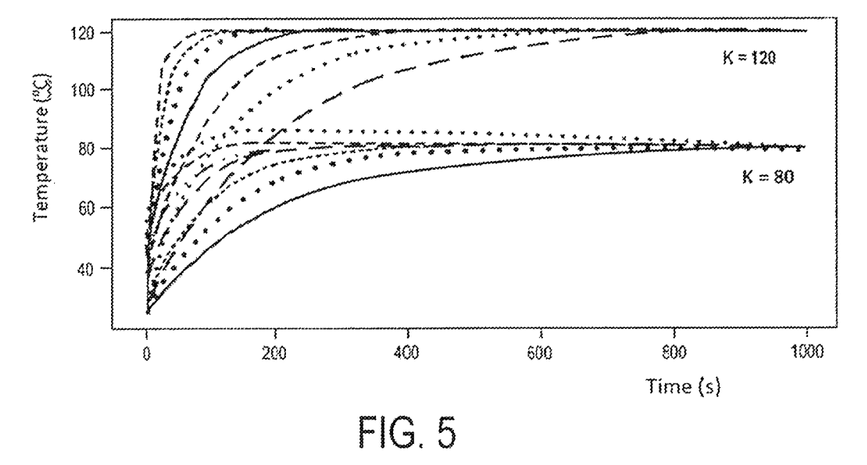
FIG. 5 is a graph of temperatures versus time of a storage system of an embodiment.
Figure 6:
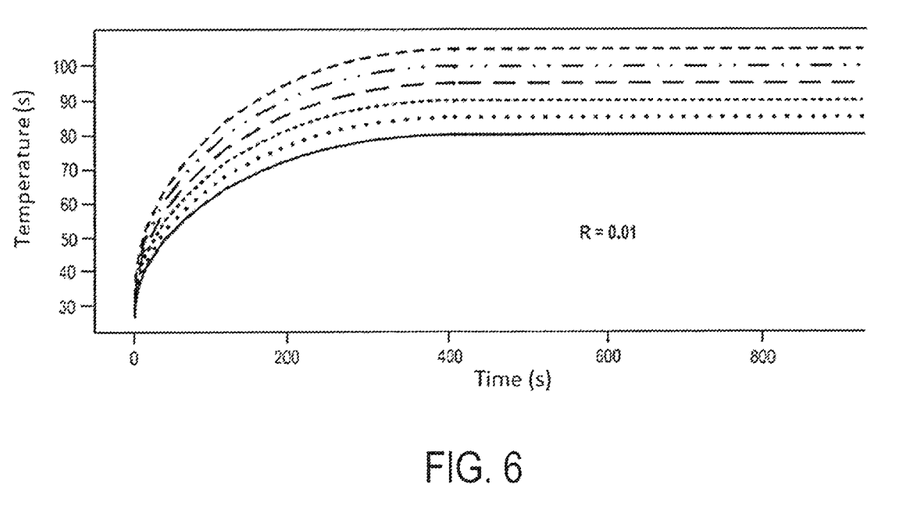
FIG. 6 is a graph of temperatures versus time of a storage system of an embodiment, where different curves are saturating at different temperatures.

FIG. 5 shows a graph of the temperature versus time for seven varied 'R' values for two different 'K' values. As the R value does not change much for a given system, the scope of the curves is shown in FIG. 6, where different curves are saturating at different temperatures while 'R' is same. Since changing the performance changes the saturating temperature, a relation between performance and saturating temperature (K) can be drawn to decide the throttle amounts at different triggers.

Now that the above paragraphs have explained the behavior of the curve at various scenarios, the following paragraphs show the experimental data and how well the theoretical equation matches the experimental data. These experiments were performed on a one terabyte (TB) microSD card as reference.

Figure 7:
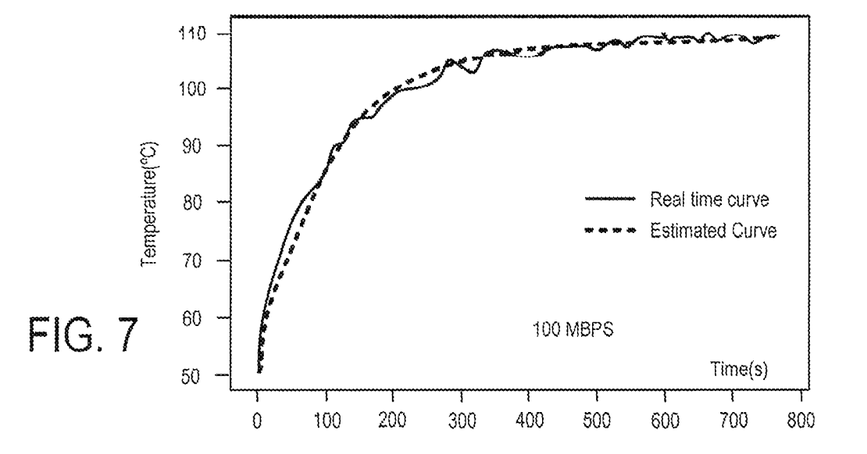
FIG. 7 is a graph of real time and estimated temperature versus time curves of an embodiment.
Figure 8:
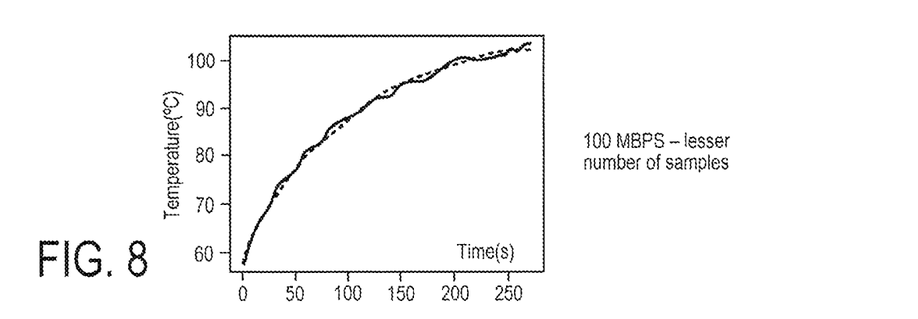
FIG. 8 is a graph of temperatures versus time of a storage system of an embodiment with a lesser number of samples than FIG. 7 but at the same sampling rate.
Figure 9:
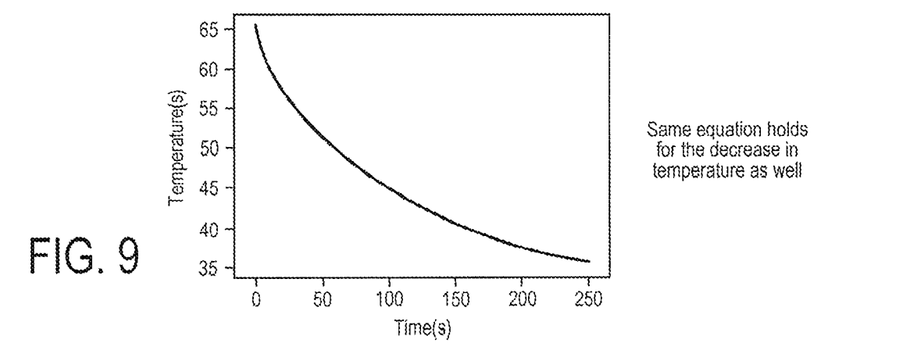
FIG. 9 is a graph of temperatures versus time of a storage system of an embodiment.

The curves in FIGS. 7-9 shows the experimental versus estimated curves. The method of curve estimation is discussed below. The figures show temperature versus time at various write performances. The mean error in FIG. 7 is more in the 800 seconds because the same (K,R) is used for a larger time frame compared to FIG. 8. FIG. 9 shows that the same equation holds for the decrease in temperature as well.

Figure 10:
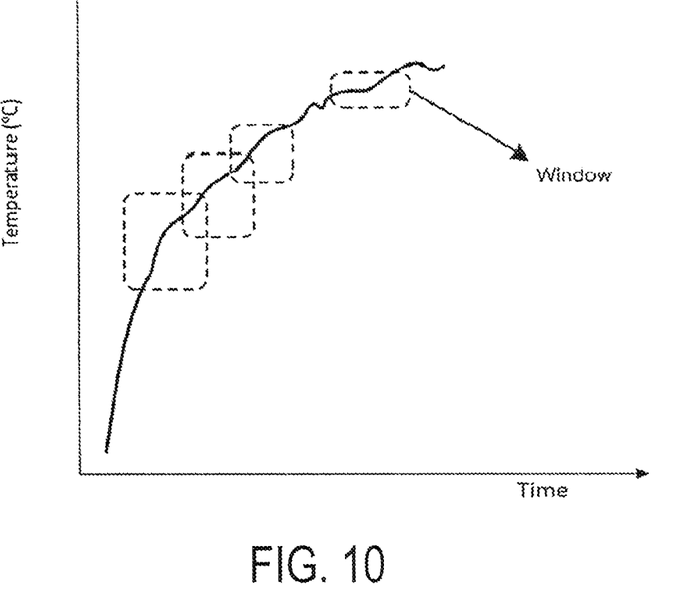
FIG. 10 is a graph of a moving sampling window on a temperature versus time curve of an embodiment.

In one embodiment, the controller 102 (e.g., firmware) uses temperature sensor samples to estimate the curve. The temperature sensor can be located in the memory 104, near the memory 104 within the enclosure of the storage system 100, or in any other suitable location. The temperature is sampled for a period of time (called a window), and the window can move by any number of samples each time. This is shown in FIG. 10. The length of the window, frequency of sampling the temperature, and the number of samples the window moves every time depends on the storage system 100 and can even dynamically change based on temperature or any other state that triggers any change. Even in case of changes in host/surroundings, the 'K,R' can adapt by next window. So, in short, a window of 'N' temperature samples moves with time. Curve prediction is done for every window, and the throttling amount is decided based on the estimated future.

Figure 11:
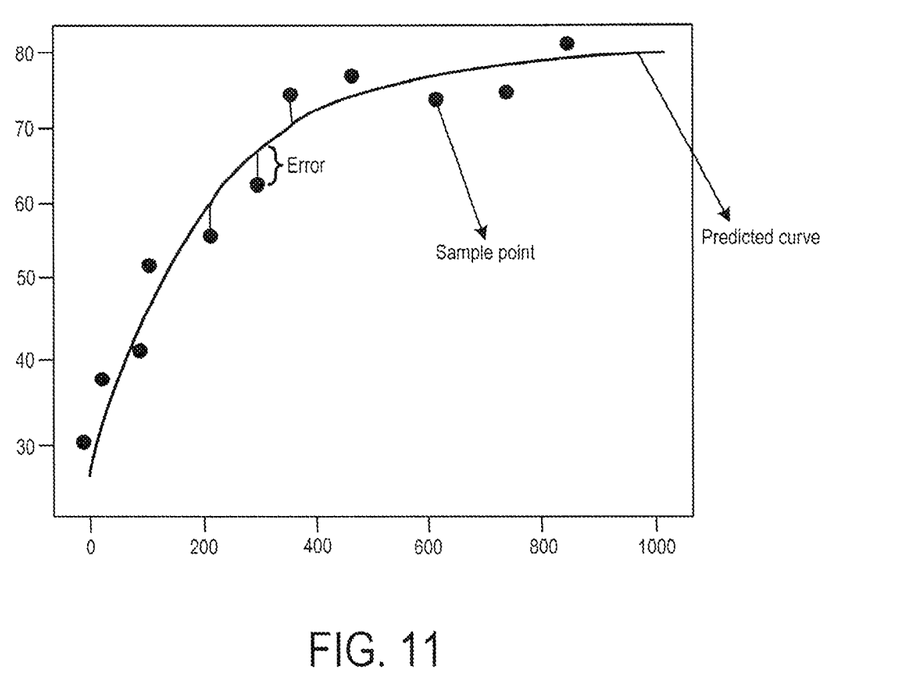
FIG. 11 is a graph of a predictive curve of an embodiment.

As shown in FIG. 11, the goal is to predict the temperature curve based on sample points. To estimate the curve, let's revisit the equation again: $T=K-e^{-Rt}(K-T_0)$. Once we have temperature data, K and R are the only unknowns in the above equation. Consider we have 'N' samples of temperature $[T_0, T_1, \ldots T_i, \ldots T_{N-1}]$ for time $t=[0, 1, \ldots i, \ldots N-1]$ respectively. The objective is to minimize the sum of absolute errors of all points. The two variables are estimated one at a time to reduce the complexity of algorithm.

Assume the parameter 'R' is known.

$T=K-e^{-Rt}(K-T_0)$,

Substituting $K-T_0=F \Rightarrow K=F+T_0$ $\Rightarrow T=F+T_0-e^{Rt}(F)$ $\Rightarrow T-T_0=F-e^{Rt}(F)$ $\Rightarrow Y=F-F, e^{-Rt}$, where $Y=T-T_0$ Error of estimation of any sample point 'i'

$E_i=Y_i-F+F, e^{-Rti}$ $\Rightarrow E_i^2=(Y_i-F+F, e^{-Rti})^2$ $\Rightarrow E_i^2=Y_i^2+F^2+F^2 e^{-2Rti}-2Y_iF-2F^2 e^{-Rti}+2Y_iFe^{-Rti}$ Sum of squares of errors of all the sample points:

$$\sum_0^n E_i^2 =$$

$$\sum_0^n Y_i^2 + nF^2 + F^2 \cdot \sum_0^n e^{-2Rti} - 2F \sum_0^n Y_i - 2F^2 \sum_0^n e^{-Rti} + 2F \sum_0^n Y_i e^{-Rti}$$

As the sum of squares of errors is minimum at the desired 'F':

$$\frac{\partial}{\partial F} \sum_0^n E_i^2 = 0$$

$$=> \frac{\partial}{\partial F} \left[ \sum_0^n Y_i^2 + nF^2 + F^2 \cdot \sum_0^n e^{-2Rti} - \right.$$

-continued $$= > 2nF + 2F \cdot \sum_0^n e^{-2Rt_i} - 2\sum_0^n Y_i - 4F\sum_0^n e^{-Rt_i} + 2\sum_0^n Y_i e^{-Rt_i} \Bigg] = 0$$

$$= > 2F\left(n + \sum_0^n e^{-2Rt_i} - 2\sum_0^n e^{Rt_i}\right) - 2\left(\sum_0^n Y_i - \sum_0^n Y_i e^{-Rt_i}\right) = 0$$

$$= > F = \frac{\sum_0^n Y_i - \sum_0^n Y_i e^{-Rt_i}}{n + \sum_0^n e^{-2Rt_i} - 2\sum_0^n e^{-Rt_i}}$$

$$= > F = \frac{\sum_0^n [(Y_i) \cdot (1 - e^{-Rt_i})]}{\sum_0^n [1 + e^{-2Rt_i} - 2e^{-Rt_i}]}$$

$$Y_i = T_i - T_0; K = F + T_0$$

$$= > K = \frac{\sum_0^n [(T_i - T_0) \cdot (1 - e^{-Rt_i})]}{\sum_0^n [1 + e^{-2Rt_i} - 2e^{-Rt_i}]} + T_0$$

Figure 12:
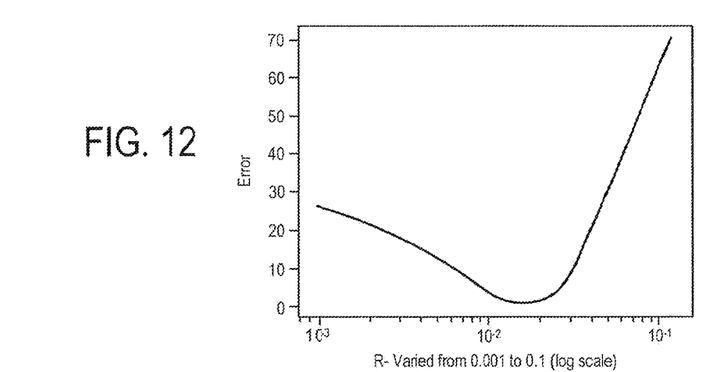
FIG. 12 is a graph of an error versus curvature factor of an embodiment.

For every given 'R,' the parameter 'K' is estimated using the above equation. The problem is to estimate 'R.' Varying 'R' on an exponential scale between a selected range and plotting error versus R after estimating 'K' for a window gives a V-shape curve as shown in FIG. 12. The range of 'R' is selected by checking various trails for different conditions. Because the curve is V-shape, we can employ a binary search to hit the error minima. At every point, errors at two adjacent 'Rs' are calculated to know on which side the lower peak is and if the error is less than a specified value (the minimum point).

It is important to note that values are chosen on an exponential scale for 'R' where the difference between any consecutive values is proportional to the value. Because a linear scale would give a sharp needle-like curve in a big range, a lot of unnecessary samples are needed in a linear scale.

Now that the curve is estimated, the decision making for the throttling is subjective and depends on the product. For example, the model may only trigger after a certain temperature is hit (e.g., 35° C.), and the window can move by 'n' samples every time. If 'R' for a particular application does not change much, R can be estimated for every four windows using same 'R' every four windows, while estimating K for every window. Also, the decision making by the controller 102 (e.g., firmware) can be after every window or after fixed set temperature thresholds. In addition, to handle worst-case exceptions, a few temperature thresholds or any unexpected events can be used to trigger fixed delays. Throttling can be done in a few stages to have a smooth performance shift. In case of abrupt throttling, the window may need to start again because the value of K may have changed too much. Hardware accelerators can also be employed to reduce the delay, in case an application involves a lot of computations and thresholds.

Figure 13:
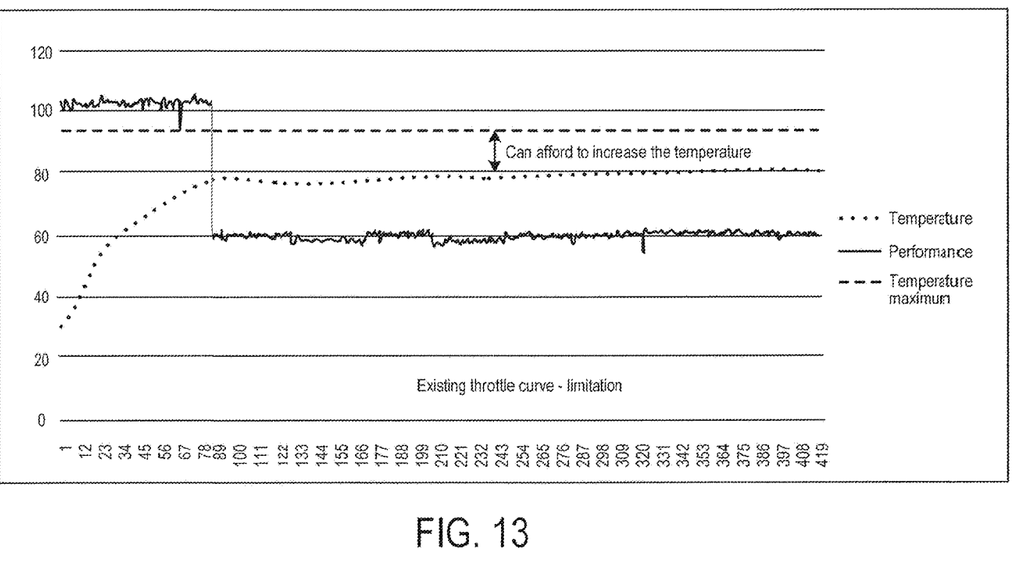
FIG. 13 is a graph of real-time temperature and performance versus time for a storage system of an embodiment.

FIG. 13 is a plot of real-time temperature and performance versus time while transferring a large file in to the card when the host starting temperature is 30° C. This figure explains the limitation of existing static throttling. The firmware throttles the performance by 40 MBPS when the temperature reaches 75° C. While 40 MBPS is too much to throttle in the above case, if that static 40 MBPS delay is changed to a static 25 MBPS delay, then the system experiences problems in other cases where ambient temperature is high. So, dynamic data driven throttling estimates the delay based on the curve estimation, and, in the above case, a smooth throttling with average performance amounting to 85 MBPS can be achieved.

There are several advantages associated with these embodiments. For example, these embodiments can provide increased average performance during large data transfers, dynamic decision making based on a curve prediction, a single solution to estimate the curve for various products, performance sustainment, and a smooth performance shift, such that a user would not detect any sudden throttle. Also, these embodiments can provide improved performance at high temperature conditions. As a result, instead of throttling due to NAND limitation, the storage system of these embodiments provide improved performance.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a three-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
take samples of temperatures of the memory over a rolling window;
dynamically change, based on a temperature of the memory, a length of the rolling window, a frequency of temperature sampling of the memory in the rolling window, and a movement of the rolling window over time;
generate estimated future temperature curves from the samples of temperatures of the memory;
determine memory throttling delays to apply based on each estimated future temperature curve; and
reduce a number of program command sequences sent to the memory and a number of program operations performed by the memory by dynamically applying the memory throttling delays based on each estimated future temperature curve, wherein each estimated future temperature curve is associated with a relationship between performance and saturation temperature, which is used to determine the memory throttling delays.

2. The storage system of claim 1, wherein the controller is further configured to estimate each future temperature curve based on the saturation temperature and a curvature factor.

3. The storage system of claim 1, wherein the controller is further configured to estimate each future temperature curve by minimizing a sum of squares of errors.

4. The storage system of claim 1, wherein the controller is further configured to estimate a new future temperature curve after applying the memory throttling delays.

5. The storage system of claim 1, wherein the controller is further configured to apply static throttling as an exception handling operation.

6. The storage system of claim 1, wherein the memory comprises a three-dimensional memory.

7. The storage system of claim 1, wherein the storage system is configured to be embedded in a host.

8. The storage system of claim 1, wherein the storage system is configured to be removably connected to a host.

9. The storage system of claim 1, wherein the controller is further configured to dynamically apply the memory throttling delays based on each estimated future temperature curve rather than applying memory throttling delays based on fixed, pre-defined thresholds.

10. A method comprising:
performing the following in a storage system:
taking samples of temperatures of a memory over a rolling window;
dynamically changing, based on a temperature of the memory, a length of the rolling window, a frequency of temperature sampling of the memory in the rolling window, and a movement of the rolling window over time;
generating estimated future temperature curves from the samples of temperatures of the memory;
determining memory throttling delays to apply based on each estimated future temperature curve; and
reducing a number of program command sequences sent to the memory and a number of program operations performed by the memory by dynamically applying the memory throttling delays based on each estimated future temperature curve, wherein each estimated future temperature curve is associated with a relationship between performance and saturation temperature, which is used to determine the memory throttling delays.

11. The method of claim 10, wherein each future temperature curve is estimated based on an actual temperature of the memory, the saturation temperature, and a curvature factor.

12. The method of claim 10, further comprising using a minimizing-a-sum-of-squares-of-errors technique to estimate each future temperature curve.

13. The method of claim 10, further comprising estimating a new future temperature curve after applying the memory throttling delays.

14. The method of claim 10, further comprising applying static throttling in response to an exception.

15. The method of claim 10, wherein the storage system is configured to be embedded in a host.

16. The method of claim 10, wherein the memory throttling delays are dynamically applied based on each estimated future temperature curve rather than applying memory throttling delays based on fixed, pre-defined thresholds.

17. A storage system comprising:
a memory;
means for taking samples of temperatures of the memory over a rolling window;
means for generating estimated future temperature curves from the samples of temperatures of the memory;
means for determining memory throttling delays to apply based on each estimated future temperature curve; and
means for reducing a number of program command sequences sent to the memory and a number of program operations performed by the memory by dynamically applying the memory throttling delays based on each estimated future temperature curve, wherein each estimated future temperature curve is associated with a relationship between performance and saturation temperature, which is used to determine the memory throttling delays.

* * * * *